United States Patent [19]
Brinkman

[11] 3,715,610
[45] Feb. 6, 1973

[54] DYNAMOELECTRIC MACHINE COOLED BY A ROTATING HEAT PIPE
[75] Inventor: William Guy Brinkman, Schenectady, N.Y.
[73] Assignee: General Electric Company
[22] Filed: March 7, 1972
[21] Appl. No.: 232,385

[52] U.S. Cl. .......................... 310/54, 310/58, 310/64
[51] Int. Cl. ................................................ H02k 9/20
[58] Field of Search .......... 310/54, 52, 53, 55, 56, 57, 310/58, 59, 60, 64, 65

[56] References Cited
UNITED STATES PATENTS

| 1,700,840 | 2/1929 | Gay | 310/52 |
| 2,897,382 | 7/1959 | Hamill | 310/64 |
| 2,898,484 | 8/1959 | Krastchew | 310/54 |
| 3,122,668 | 2/1964 | Cuny | 310/64 |

Primary Examiner—R. Skudy
Attorney—John J. Kissane et al.

[57] ABSTRACT

A dynamoelectric machine is described wherein heat generated within the rotor is removed utilizing a heat pipe rotating about the rotor shaft. Heat is absorbed from the rotor by vaporization of a portion of the refrigerant within a rectangular evaporator juxtaposed with the heat generating region of the rotor whereafter the vaporized refrigerant flows radially inward (due to centrifugal forces acting upon the higher density liquid refrigerant) to pass to a condenser coil secured to the rotor at a relatively cool location. Upon cooling to a liquid state in the condenser, the liquid refrigerant is forced radially outward along the condenser coil to return to the evaporator through a radially outer orifice. Preferably, the evaporator is situated within the rotor coils, e.g., at the center of the field pole winding of a synchronous machine, although the evaporator also could be positioned along any radially extending side of the rotor coil. Because refrigerant passes from the evaporator to the condenser and returns to the evaporator solely by centrifugal forces acting upon the closed cooling system, a separate refrigerant pump is not required to cool the motor.

8 Claims, 5 Drawing Figures

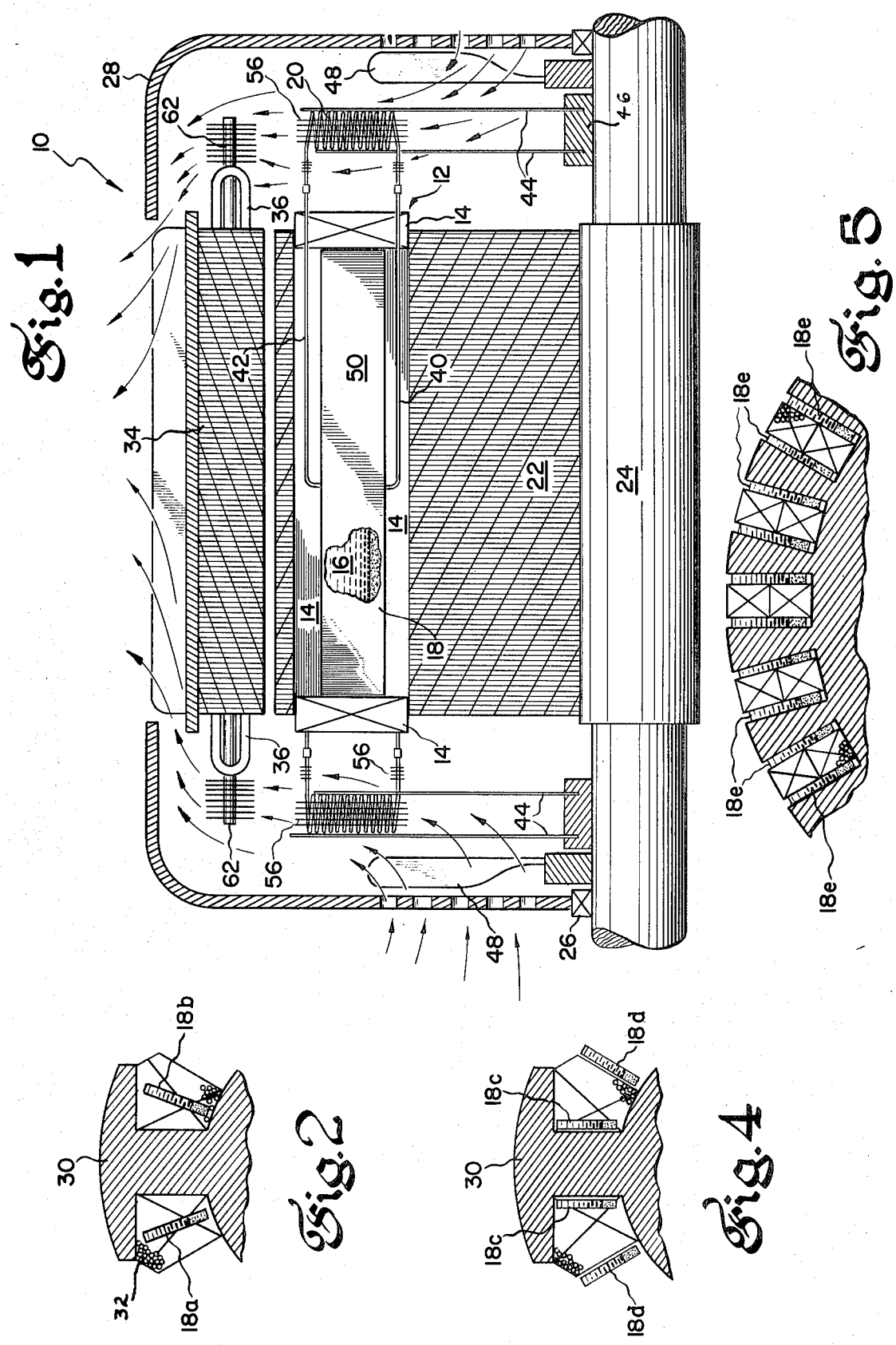

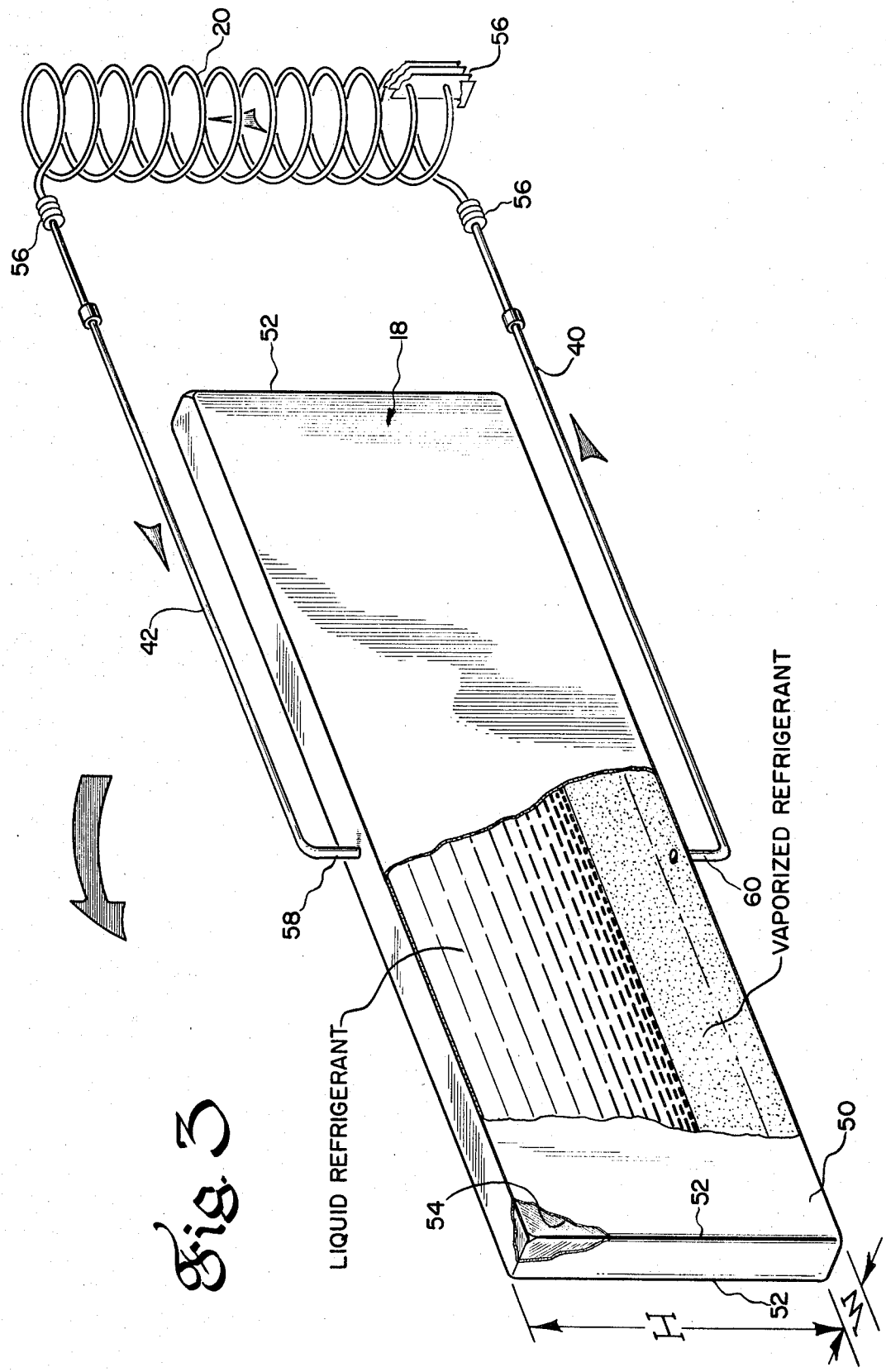

DYNAMOELECTRIC MACHINE COOLED BY A ROTATING HEAT PIPE

THE DISCLOSURE

This invention relates to a dynamoelectric machine having enhanced rotor cooling and, in particular, to a dynamoelectric machine wherein heat is removed from the rotor by the passage of refrigerant through its thermal cycle utilizing the centrifugal force of the rotor to transfer refrigerant between the condenser and evaporator.

Cooling of dripproof, or open, dynamoelectric machines typically is achieved by passing air through the machine to absorb heat by convection from the heat generating components within the machine. Although through ventilation normally is adequate for most machine operations as machines become more compact, the passages for air flow through the machine become reduced in area decreasing the volume of air capable of passing therethrough. To achieve further cooling of dynamoelectric machines, the machine also can be sealed and liquid refrigerant passed through the machine in direct contact with the heat generating regions of the machine. Such systems typically require mechanical pumps to pass refrigerant through the machine and the windage and friction losses of the machine are significantly increased by the interaction of the liquid refrigerant with the rotating rotor.

It also is known that heat can be removed utilizing heat pipes (i.e., cooling systems not requiring separate pumping means for refrigerant transport) with gravitational force or wicks typically being utilized in stationary heat pipes for cycling the refrigerant through the system while centrifugal force normally is employed for refrigerant transport in rotating heat pipes. For example, it heretofore has been suggested that the rotor shaft of a dynamoelectric machine be utilized as a heat pipe by tapering the interior of the hollow rotor shaft to return refrigerant condensed to a liquid state outside the axial span of the rotor to the rotor interior for reevaporation. Similarly, it has been proposed that the rotor bars of a squirrel cage rotor be hollow and protrude from at least one end of the rotor laminations to permit the bars to be utilized as heat pipes to cool the rotor interior. Liquid flow from the protruding end of the rotor bars to the rotor interior, however, generally would have to be accomplished by wicking or tapering the interior of the rotor bars using sophisticated machining procedures and the extended bars must be supported by suitable bracing techniques.

It is therefore an object of this invention to provide a dynamoelectric machine having enhanced rotor cooling produced by heat pipes.

It is also an object of this invention to provide a dynamoelectric machine having a heat pipe situated at the heat generating region of the machine wherein centrifugal force is utilized to pump refrigerant through the rotor cooling system.

It is a still further object of this invention to provide a method of cooling a dynamoelectric machine utilizing an off-axis heat pipe wherein centrifugal force is employed for refrigerant transmission through the rotor cooling system.

These and other objects of this invention generally are achieved by a dynamoelectric machine having an evaporator in thermal contact with the heat generating region of the rotor to absorb heat therefrom by the vaporization of refrigerant within the evaporator. The vaporized refrigerant then flows radially inward (due to the centrifugal force acting upon the higher density liquid) through suitable conduit means to a condenser fixedly secured along the rotor in a sufficiently cool environment to condense the refrigerant vapor back to the liquid state. Suitable conduit means communicates the radial outer end of the condenser with the evaporator and permits the centrifugal force acting upon the condensed refrigerant to return the refrigerant to the evaporator to repeat the thermal cycle. In a particularly preferred embodiment of the invention, the evaporator is situated in the middle of the field pole winding of a synchronous machine and the condenser is located axially outboard from the field pole winding to be air cooled by an air stream flowing thereacross.

Although this invention is described with particularity in the appended claims, a more complete understanding of the invention may be obtained from the following detailed description of various specific embodiments of this invention when taken in conjunction with the appended drawings wherein:

FIG. 1 is a sectionalized view of a synchronous pole dynamoelectric machine in accordance with this invention, FIG. 2 is a sectional view taken through the rotor field pole of the synchronous machine of FIG. 1 to illustrate a preferred disposition of the evaporator within the field pole winding.

FIG. 3 is an isometric view of the heat pipe utilized to cool the field pole windings of the machine illustrated in FIG. 1, FIG. 4 is a sectional view of the rotor field pole to show an alternate disposition of the evaporator in the field pole winding, and FIG. 5 is an illustration of a preferred disposition of the evaporator adjacent prewound coils forming the rotor windings of an induction machine.

A synchronous machine 10 cooled by a rotating heat pipe 12 in accordance with this invention is illustrated in FIG. 1 wherein heat generated within the field pole winding 14 of the synchronous motor is removed by evaporation of refrigerant 16 within evaporator 18. The gaseous refrigerant then flows to a condenser 20 situated outside the field pole winding to be reconverted to a liquid state whereupon the centrifugal force acting upon the condensed refrigerant returns the refrigerant to the evaporator to repeat the thermal cycle. Because refrigerant is returned to the evaporator by centrifugal force produced by rotor operation, no separate mechanical pumping means are required to circulate the refrigerant through the heat pipe.

Synchronous motor 10 is generally conventional in design (except for the refrigerant system utilized therein to maximize machine output) and generally comprises a rotor formed of a plurality of stacked magnetic laminations 22 axially mounted upon shaft 24 journaled within bearings 26 mounted at opposite ends of motor housing 28. In conventional synchronous fashion, the magnetic laminations are punched to provide field poles 30 (as illustrated in FIG. 2) which poles are wound by wrapping a continuous insulated conductor 32 into a plurality of loops about the stacked laminations to form field pole winding 14. The rotor of the synchronous machine is circumferentially enclosed by a stator 34 (illustrated in FIG. 1) having windings 36 secured within axially extending slots (not shown) in the stator to drive the rotor by the interaction of the rotor with the magnetic field produced upon energization of the stator with a suitable A.C. power source.

During winding of field pole winding 14, evaporator 18 is positioned at approximately the center of the winding and is retained in position by the field pole windings subsequently wrapped thereover. To facilitate winding of the field poles by machine, evaporator 18 is detached from the condenser during winding of the field poles at a location along conduits 40 and 42 ( interconnecting the evaporator and condenser) such that only straight, axially extending ends of the conduits protrude from the completed field pole winding. After the field pole has been completely wound, the evaporator is joined to the condenser, e.g., by any suitable mechanical joining technique such as soldering, to form a closed refrigerant unit. Condenser 20 then is secured to the rotor shaft by suitable bracing means, such as the illustrated supports 44 extending radially from the condenser to ring 46 shrunk upon rotor shaft 24.

To maximize cooling of the motor, the condensers for evaporators situated on opposite sides of a single field pole, i.e., evaporators 18a and 18b of FIG. 2, preferably are situated at axially opposite ends of the rotor within the flow path of air passed through the end regions of the motor housing. It will be appreciated, however, that design limitations on the axial length of the motor and/or economy reasons may make it desirable to have all condensers situated at one axial end of the motor. The evaporators preferably also should extend substantially the entire length of the field pole winding to remove heat therefrom.

Motor 10 typically may be cooled by fans 48 drawing air through the end sheilds to propel the air across the condenser before the heated air is expelled from the motor end through which the air entered. The air expelled from end cavities then can be directed along the axially outer surface of the finned stator frame to enhance the transfer of heat from the stator frame to the adjacent air. If desired, a stationary heat pipe 62 of conventional design can extend axially through the stator and protrude from one (or both) axial ends of the stator into the air flow stream to additionally cool the stator. Although the air flow is illustrated in FIG. 1 as passing along the outside of the motor frame, any air flow path, e.g., air flow axially through the air gap or other axial passages in the motor (typically propelled by a fan at a single end of the motor), also could be used to ventilate the motor.

An evaporator particularly preferred for utilization in this invention is illustrated in FIG. 3 and generally comprises a radially elongated, circumferentially narrow rectangular vessel 50 which extends substantially the entire axial length of the pole body, i.e., the evaporator terminates less than approximately two inches from each axial end of the pole body to permit bending of the field pole conductor therearound. In general, evaporator 18 can be formed of any thermally conductive material and preferably is formed of stainless steel or copper stamped to the desired rectangular configuration. To inhibit shorting of the field pole conductor to the evaporator, the evaporator edges 52 remote from the field pole bodies preferably are rounded although rectangular edges can be utilized when the pressure of the conductor against the edges is insufficient to cut through the insulation upon the conductor. A thin, i.e., less than 10 mils thick, layer of electrical insulation 54 such as Mylar also can be coated atop the evaporator, if desired, to inhibit shorting of the field pole winding. The evaporator has a radial height H at least 50 percent, and preferably greater than 70 percent, of the radial height of the field pole winding to maximize thermal contact therebetween while the width W of the evaporator should be narrow to maximize the amount of copper in the field pole winding. Preferably, the height to width ratio of the evaporator should be at least 5 to 1. While the foregoing height to width ratio preferably exists in a single evaporator, a group of evaporators also could be stacked to achieve the desired large radial height and narrow width desired for good thermal transfer.

The refrigerant utilized in the evaporator should be characterized by a saturation temperature above the temperature of the air flowing through the end regions of the motor to permit conversion of vaporized refrigerant to a liquid state by the passage of air across condenser 20. Moreover, the refrigerant also should evaporate at a temperature below the maximum operating temperature of the field pole windings at the total pressure produced by the initial refrigerant charge pressure and centrifugal force upon the liquid refrigerant at the normal operating speed of the machine to permit evaporation of the refrigerant in evaporator 18 by heat exchange with the adjacent windings. In general, the centrifugal pressure upon the liquid refrigerant produced by the speed of the machine is a function of the refrigerant density, the rotor speed and the distance of the evaporator from the axis of the rotor while the temperature of the field pole winding is a function of the copper loss at a given load. Thus, if the rating of a synchronous generator were to be increased by 50 percent, the difference between the field pole winding loss at the uprated load and the field pole winding loss at rated load would have to be dissipated by thermal conduction to evaporator 18. For an 1,800 rpm generator having an evaporator with an average refrigerant level approximately 7 inches from the rotor shaft, Freon 21 having a saturation temperature of 170°F would be adequate as a refrigerant for the generator in an operating ambient of approximately 132°F. Because heat is transferred to the liquid refrigerant primarily by heat of vaporization, the refrigerant should fill a majority, and preferably at least 70 percent, of the radial height of the evaporator at the rated speed of the machine.

Condenser 20 preferably is a helical coil situated within the air stream produced by fan 48 to condense the vaporized refrigerant to a liquid. Typically, the condenser may be a helically shaped copper coil having a plurality of radial fins 56 along the outer periphery of the coil to maximize thermal exchange between the refrigerant and the air stream passed over the outer surface of the coil. The condenser coil also should be radially tapered away from the shaft along the entire length of the coil to assure that condensed liquid refrigerant flows radially outward through the coil to return to the evaporator through liquid intake orifice 58 at the radial outer end of evaporator 18.

During operation of the motor, the high density liquid refrigerant within the evaporator is forced by centrifugal force against the radial outer surface of the evaporator (as shown in FIG. 3) and the refrigerant flows through conduit 42 into condenser 20 to an identical height. As heat is absorbed by the evaporator from field pole winding 14, a portion of the refrigerant is vaporized and tends to pass through radially inner orifice 60 and conduit 40 to condenser 20. The cool air stream flowing across the condenser then returns a portion of the refrigerant to a liquid whereupon the centrifugal force moves the relatively higher density liquid refrigerant in a radial outer direction along the coil to return the condensed refrigerant to the liquid refrigerant region of the condenser. Since the liquid level within condenser 20 and evaporator 18 necessarily must be equal, the return of liquid refrigerant to the liquid refrigerant level in the condenser produces an increase in the liquid level of evaporator 18. The entire thermal cycle of the refrigerant thus is completed without the application of an external pumping force to the heat transfer system.

From the foregoing thermal cycle, it will be apparent that the refrigerant intake and exhaust orifices need not be positioned on radially opposite faces of the evaporator but can protrude from a single side of the evaporator provided the refrigerant exhaust orifice from the evaporator is located radially inward of the liquid refrigerant surface during rotation of the rotor and the refrigerant intake orifice is located radially outward from the liquid refrigerant surface to communicate with the liquid refrigerant reservoir in the condenser during rotation. In general, intake and exhaust orifices on radially opposite faces of the evaporator maximize utilization of the evaporator although such design somewhat increases the mechanical pressure on the joints between the evaporator and conduits 40 and 42.

While evaporator 18 preferably is disposed at the center of the field pole winding of a synchronous machine, the evaporator also can be positioned along a radially extending edge of the field pole winding as is illustrated in FIG. 4. Positioning of evaporators 18c and 18d adjacent opposite radial edges of the field pole winding permits continuous winding of the field pole without the necessity for interrupting the winding to position the evaporator therein. However, unless an evaporator is positioned both adjacent the field pole and the outer periphery of the field pole winding, as is shown in FIG. 4, the span required for heat transfer to the evaporator is significantly increased. The thermal cycle of the refrigerant, however, is identical to that of the heat pipe structure shown in FIG. 1 with refrigerant evaporated in the evaporators being passed to a condenser coil for reconversion back to a liquid state whereafter the condensed liquid refrigerant is returned to the evaporator by the centrifugal force acting upon the higher density liquid refrigerant within the coil.

Although the evaporator of this invention is particularly suitable for utilization with synchronous machines, the evaporator also can be utilized in rotors would with pre-formed coils by positioning the evaporator adjacent the pre-formed coils, as is shown in FIG. 5. The radial height of evaporator 18e again is substantially greater than the width of the evaporator to maximize the amount of the windings which can be positioned within the rotor slots. The operation of the refrigerant system, however, is otherwise identical to that of the synchronous pole machines previously described in the application.

Although various specific embodiments of this invention have been described, it will be apparent to those skilled in the art that variations may be made in the refrigerant system of this invention without departing from the broad scope of this invention. For example, the evaporator could be positioned between rotor windings of a random wound rotor to permit the transfer of heat therefrom. The appended claims therefore are intended to cover all such changes and modifications as fall within the true spirit and scope of this invention.

What I claim as new and desire to secure by Letters Patent of the United States:

1. In a dynamoelectric machine characterized by a rotor, a stator and at least one coil formed of an electrical conductor multiply wound into a plurality of substantially closed loops upon said rotor to rotate therewith, the improvement comprising a radially elongated evaporator disposed within said coil to rotate about the axis of said rotor, said evaporator containing fluid refrigerant vaporizable at a temperature below the maximum operating temperature of said coil at the total pressure upon said refrigerant in a liquid state at the normal operating speed of said machine to remove heat from said coil by conversion of said refrigerant from a liquid to a gaseous state, a condenser suitable outside said coil within an environment sufficiently cool to convert gaseous refrigerant to a liquid state, means interconnecting said evaporator and said condenser to permit gaseous refrigerant formed by absorption of heat from said coil to exit from a radially inward orifice of said evaporator to said condenser and means for returning condensed liquid refrigerant from said condenser to a radially outer orifice of said evaporator by the centrifugal forces acting upon said liquid refrigerant.

2. A dynamoelectric machine according to claim 1 wherein said evaporator has a radial height in excess of 50 percent of the radial height of the coil wherein said evaporator is located, the width of said evaporator in the direction of rotor rotation being less than 20 percent of the evaporator height.

3. A dynamoelectric machine according to claim 2 wherein said machine is a synchronous machine, an evaporator is situated on each side of the field poles of the synchronous machine and the condensers associated with evaporator on opposite sides of a given field pole are located at axially opposite ends of the machine.

4. A dynamoelectric machine comprising a cylindrical stator, a rotor journaled at both ends to rotate within said stator, a plurality of field poles extending radially outward from said rotor, field pole windings formed of an insulated conductor multiply wound about the body of said field poles, a radially elongated evaporator having a height to width ratio in excess of 5:1 disposed within said field pole winding, said evaporator containing a fluid refrigerant vaporizable at a temperature below the maximum operating temperature of said field winding at the total pressure upon said refrigerant in a liquid state at the normal operating speed of said machine, a condenser disposed outside said coil within an environment sufficiently cool to convert refrigerant in a gaseous state to a liquid, means interconnecting said evaporator and said condenser to permit refrigerant vapor formed by absorption of heat from said coil to exit from a radially inward orifice of the evaporator to said condenser and means for returning by centrifugal force condensed liquid refrigerant from said condenser to a radially outer orifice of said evaporator.

5. A dynamoelectric machine according to claim 4 wherein said condenser is a coil formed of a plurality of helical turns, said coil having a radial taper away from the rotor axis along the length of the coil to move condensed refrigerant by centrifugal force from the condenser to the liquid refrigerant return orifice of said evaporator.

6. A dynamoelectric machine according to claim 5 wherein said condenser is cooled by the flow of air thereacross, said air entering the end of said machine adjacent said condenser and being exhausted from the same end of said machine after cooling of said coil without passage through said machine.

7. A dynamoelectric machine comprising a stationary member, a rotatable member producing heat in quantities tending to limit performance of said machine, a heat pipe in thermal contact with said rotatable member to absorb heat therefrom by the vaporization of a liquid refrigerant contained within said heat pipe, said vaporized refrigerant flowing through a radially inward exhaust orifice due to the centrifugal forces acting upon the refrigerant system to pass to a rotating condenser fixedly secured along said rotor at a location remote from the heat generating source, said condenser being situated in a sufficiently cool environment to condense refrigerant vapor to a liquid state and means connecting said condenser to said evaporator to permit centrifugal force to return condensed liquid refrigerant from said condenser to a radially outer intake orifice of said evaporator to repeat the thermal cycle.

8. A method of cooling a machine rotor comprising juxtaposing an evaporator upon said rotor at a non-axial location in thermal contact with a heat generating region of said rotor, vaporizing a portion of said refrigerant to the gaseous state to pass through a radially inner orifice to a condenser mounted upon said rotor at a location remote from said heat generating region, converting said gaseous refrigerant to a liquid state in said rotating condenser and returning said liquid refrigerant by centrifugal forces acting thereon from the condenser to a radial outer refrigerant inlet orifice of the evaporator.

* * * * *